(12) United States Patent
Itabashi et al.

(10) Patent No.: US 10,504,374 B2
(45) Date of Patent: Dec. 10, 2019

(54) TRAVEL PATH SETTING APPARATUS, METHOD OF SETTING TRAVEL PATH, AND RECORDING MEDIUM

(71) Applicant: SUBARU CORPORATION, Tokyo (JP)

(72) Inventors: Naoaki Itabashi, Tokyo (JP); Satoshi Okada, Tokyo (JP); Akihiro Yamane, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/374,524

(22) Filed: Dec. 9, 2016

(65) Prior Publication Data

US 2017/0200376 A1 Jul. 13, 2017

(30) Foreign Application Priority Data

Jan. 12, 2016 (JP) .................... 2016-003241

(51) Int. Cl.
*G08G 5/00* (2006.01)
*G01C 21/20* (2006.01)

(52) U.S. Cl.
CPC ............ *G08G 5/003* (2013.01); *G01C 21/20* (2013.01); *G08G 5/0013* (2013.01);
(Continued)

(58) Field of Classification Search
CPC .... G08G 5/003; G08G 5/0069; G08G 5/0091; G08G 5/0086; G08G 5/0078;
(Continued)

(56) References Cited

U.S. PATENT DOCUMENTS 6,259,988 B1 * 7/2001 Galkowski ............. G01C 21/00
340/989
2006/0155432 A1 7/2006 Brown
(Continued)

FOREIGN PATENT DOCUMENTS

JP 2006-321475 A 11/2006

OTHER PUBLICATIONS

Office Action issued in corresponding Japanese Patent Application No. 2016-003241, dated Oct. 10, 2017.

*Primary Examiner* — Kimberly S Berona
*Assistant Examiner* — Michael V Kerrigan
(74) *Attorney, Agent, or Firm* — McDermott Will & Emery LLP (57) ABSTRACT

A travel path setting apparatus includes an information acquiring unit, a memory, a predictable scenario creating unit, and a path searching unit. The information acquiring unit acquires surrounding information on a surrounding situation of a movable body. The memory stores a probability model related to the surrounding situation of the movable body. The predictable scenario creating unit creates, on a basis of the surrounding information and the probability model, a plurality of predictable scenarios for each of a plurality of predetermined times in future. The predictable scenarios are each the surrounding situation of the movable body that is predicted for corresponding one of the predetermined times. The path searching unit searches for and sets the travel path on a basis of the predictable scenarios created by the predictable scenario creating unit.

6 Claims, 7 Drawing Sheets

(52) U.S. Cl.
CPC ......... *G08G 5/0021* (2013.01); *G08G 5/0026* (2013.01); *G08G 5/0052* (2013.01); *G08G 5/0069* (2013.01); *G08G 5/0078* (2013.01); *G08G 5/0086* (2013.01); *G08G 5/0091* (2013.01)

(58) Field of Classification Search
CPC .. G08G 5/0052; G08G 5/0021; G08G 5/0013; G08G 5/0026; G01C 21/20
See application file for complete search history.

(56) References Cited

U.S. PATENT DOCUMENTS

| | | |
|---|---|---|
| 2008/0208474 A1 | 8/2008 | Wilson |
| 2015/0066248 A1 | 3/2015 | Arbeit et al. |
| 2016/0343258 A1* | 11/2016 | Navarro ................. G01C 21/20 |

* cited by examiner

TRAVEL PATH SETTING APPARATUS, METHOD OF SETTING TRAVEL PATH, AND RECORDING MEDIUM

CROSS-REFERENCE TO RELATED APPLICATIONS

The present application claims priority from Japanese Patent Application No. 2016-003241 filed on Jan. 12, 2016, the entire contents of which are hereby incorporated by reference.

BACKGROUND

The technology relates to a technique of setting a travel path of a movable body. In particular, the technology relates to a technique that is useful especially in creating a safe travel path taking into consideration a future change in a surrounding situation and thereby setting the travel path.

Upon setting a travel path of a movable body such as a vehicle and an aircraft, information on a surrounding situation of the movable body has been used. To give an example, a flight path of an aircraft may be created on the basis of current information acquired by equipment such as various sensors of the aircraft, thereby being set. Therefore, during the flight along the set flight path, the aircraft may run into a hindrance that has not been recognized when the information has been acquired.

To reduce a possibility of running into a hindrance during the flight, Japanese Unexamined Patent Application Publication (JP-A) No. 2006-321475 discloses a technique in which a change in atmospheric conditions within the flight path is predicted, and the flight path is modified on the basis of a result of the prediction.

SUMMARY

A technique disclosed in JP-A No. 2006-321475 involves modification of a flight path that reflects only a change in atmospheric conditions, which may lack taking into consideration other factors that may threaten safety during traveling.

For example, safety during traveling of a flying aircraft may be threatened not only by the atmospheric conditions but also by a hindrance in the air such as a bird and another aircraft. It is therefore desirable that a safe flight path be set taking into consideration the foregoing various factors.

It is desirable to create a safe travel path taking into consideration various factors that may threaten safety of traveling, and to thereby set the travel path.

An aspect of the technology provides a travel path setting apparatus. The travel path setting apparatus includes an information acquiring unit, a memory, a predictable scenario creating unit, and a path searching unit. The information acquiring unit acquires surrounding information on a surrounding situation of a movable body. The memory stores a probability model related to the surrounding situation of the movable body. The predictable scenario creating unit creates, on a basis of the surrounding information and the probability model, a plurality of predictable scenarios for each of a plurality of predetermined times in future. The predictable scenarios are each the surrounding situation of the movable body that is predicted for corresponding one of the predetermined times. The path searching unit searches for and sets a travel path of the movable body on a basis of the predictable scenarios created by the predictable scenario creating unit.

An integration unit may be further provided that integrates together the predictable scenarios created by the predictable scenario creating unit for each of the predetermined times and create an integrated predictable scenario. The path searching unit may search for and set the single travel path on a basis of the integrated predictable scenario.

The integration unit may convert a risk to safety of traveling of the movable body into a numerical value on a basis of the respective predictable scenarios created by the predictable scenario creating unit, and create a plurality of risk maps. The risk maps may each present, on map data, the risk that is converted into the numerical value. The integration unit may calculate, on a basis of the created risk maps, an integration value of the numerical values of the risks at corresponding points in the respective risk maps created for corresponding one of the predetermined times, and thereby create an integrated risk map that integrates together the risk maps for each of the predetermined times. The path searching unit may search for and set the travel path having the risk that is lowest on a basis of the integrated risk map created by the integration unit.

The movable body may be an unmanned aerial vehicle on which the travel path setting apparatus is mounted.

Another aspect of the technology provides a method of setting a travel path of a movable body. The method causes a travel path setting apparatus including a memory that stores surrounding information related to a surrounding situation of the movable body and a probability model related to the surrounding situation of the movable body to: acquire surrounding information on the surrounding situation of the movable body; create, on a basis of the surrounding information and the probability model, a plurality of predictable scenarios for each of a plurality of predetermined times in future, the predictable scenarios each being the surrounding situation of the movable body that is predicted for corresponding one of the predetermined times; and search for and set the travel path on a basis of the created predictable scenarios.

Another aspect of the technology provides a non-transitory tangible recording medium having a program of setting a travel path of a movable body. The program causes, when executed by a travel path setting apparatus, the travel path setting apparatus to function as an information acquiring unit, a memory, a predictable scenario creating unit, and a path searching unit. The information acquiring unit acquires surrounding information on a surrounding situation of the movable body. The memory stores a probability model related to the surrounding situation of the movable body. The predictable scenario creating unit creates, on a basis of the surrounding information and the probability model, a plurality of predictable scenarios for each of a plurality of predetermined times in future. The predictable scenarios are each the surrounding situation of the movable body that is predicted for corresponding one of the predetermined times. The path searching unit searches for and sets the travel path on a basis of the predictable scenarios created by the predictable scenario creating unit.

Another aspect of the technology provides a travel path setting apparatus that sets a travel path of a movable body. The travel path setting apparatus includes a memory and circuitry. The memory stores a probability model related to a surrounding situation of the movable body. The circuitry is configured to acquire surrounding information on the surrounding situation of the movable body, create, on a basis of the surrounding information and the probability model, a plurality of predictable scenarios for each of a plurality of predetermined times in future, and search for and set the travel path on a basis of the created predictable scenarios. The predictable scenarios are each the surrounding situation of the movable body that is predicted for corresponding one of the predetermined times.

DETAILED DESCRIPTION

A description is given below, with reference to the accompanying drawings, of some non-limiting implementations in which a travel path setting apparatus, a method of setting a travel path, and a travel path setting program of implementations of the technology are respectively applied to a flight path setting apparatus, a method of setting a flight path, and a flight path setting program that each set a flight path of an unmanned aerial vehicle.

[Configuration of Flight Path Setting Apparatus]

First, a configuration of a flight path setting apparatus 10 according to one implementation is described with reference to FIG. 1.

Figure 1:
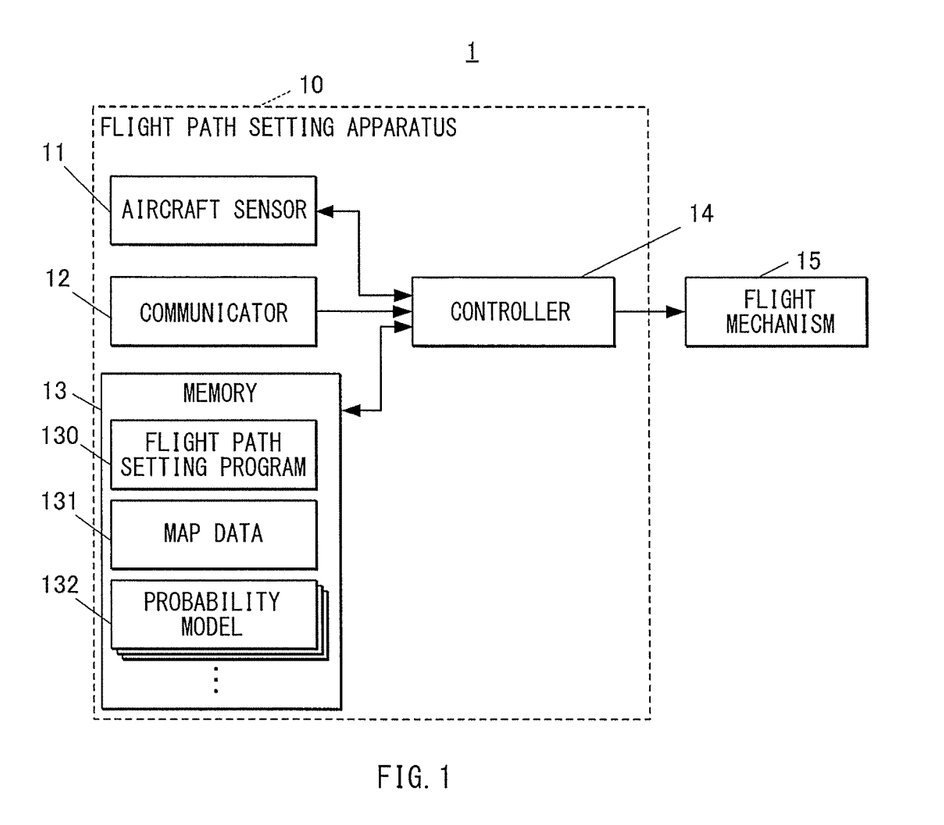
FIG. 1 is a block diagram illustrating an outline configuration of an unmanned aerial vehicle according to one implementation of the technology.

FIG. 1 is a block diagram illustrating an outline configuration of an unmanned aerial vehicle (UAV) 1 on which the flight path setting apparatus 10 is mounted.

The flight path setting apparatus 10 may be mounted on the UAV 1 in the present implementation. The flight path setting apparatus 10 may alternately be mounted on any other moving body. The flight path setting apparatus 10 may create a safe flight path for own aircraft on the basis of prediction of a future situation, and thereby set the flight path. The UAV 1 may fly within a region in which a hindrance is present in the present implementation.

Specifically, the flight path setting apparatus 10 may include an aircraft sensor 11, a communicator 12, a memory 13, and a controller 14, for example, as illustrated in FIG. 1.

The aircraft sensor 11 may include various sensors such as a sensor that detects a flight state of the UAV 1 and a sensor that acquires information on a surrounding situation of the UAV 1. The information on the surrounding situation of the UAV 1 may be hereinafter referred to as "surrounding information". Examples of the various sensors may include radar, an image sensor (a camera), a gyroscope, a velocity sensor, and a global positioning system (GPS). The aircraft sensor 11 may acquire various pieces of information on the basis of control instructions given by the controller 14, and supply a signal representing the acquired pieces of information to the controller 14.

The communicator 12 may communicate with a control facility on the ground, at the sea, or in the air. The communicator 12 may communicate with another aircraft, etc. The communicator 12 may transmit various signals to and receive various signals from the foregoing control facility, another aircraft, etc. Further, the communicator 12 may be accessible to various pieces of information through connection to a communication network.

The memory 13 may store a program, data, etc., that are used to achieve various functions of the UAV 1. The memory 13 may also serve as a workspace. The memory 13 may store a flight path setting program 130 in the present implementation.

The flight path setting program 130 may cause the controller 14 to execute a flight path setting process which is described later with reference to FIG. 2.

The memory 13 may store map data 131 and various probability models 132 as pieces of information that are necessary to execute the flight path setting process described later.

The map data 131 may include comprehensive geographic information including terrain information and information on a utilization state of the land. Examples of the terrain information may include information on a mountain and a river. Examples of the information on the utilization state of the land may include information on a road, a railway, and a building. The memory 13 may store at least the map data 131 of a predetermined range including a flight region of the UAV 1.

The probability model 132 is related to the surrounding situation of the UAV 1, and may express rules of a probability of an uncertain matter. The probability model 132 in the present implementation may be related to information on a hindrance such as a traveling velocity, a traveling direction, ability, and performance of the hindrance, weather, etc. The probability model 132 in the present implementation may be set on the basis of terrain, the weather, a pattern, experimental rules, etc.

It is to be noted that the memory 13 may store the plurality of probability models 132 corresponding to a plurality of kinds of surrounding situations such as the traveling velocity of the hindrance and the weather. However, the memory 13 may store a plurality of probability models 132 for one kind of surrounding situation. To give an example, a probability of a sudden change in weather largely differs between fine weather and stormy weather. To address this difference, the probability model 132 related to the weather may include both the probability model 132 related to the fine weather and the probability model 132 related to the stormy weather. In this case, the optimal probability model 132 may be selected depending on the surrounding situation.

The controller 14 may perform a central control of each unit included in the UAV 1. Specifically, the controller 14 may perform a drive control of a flight mechanism 15 including components such as an engine and a control surface actuator, and thereby control the flight of the UAV 1, for example. Further, the controller 14 may load the program stored in the memory 13, and thereby execute the various processes on the basis of the loaded program.

[Operation of Flight Path Setting Apparatus]

A description is given below of operation of the flight path setting apparatus 10 performed upon execution of the flight path setting process, with reference to FIG. 2.

Figure 2:
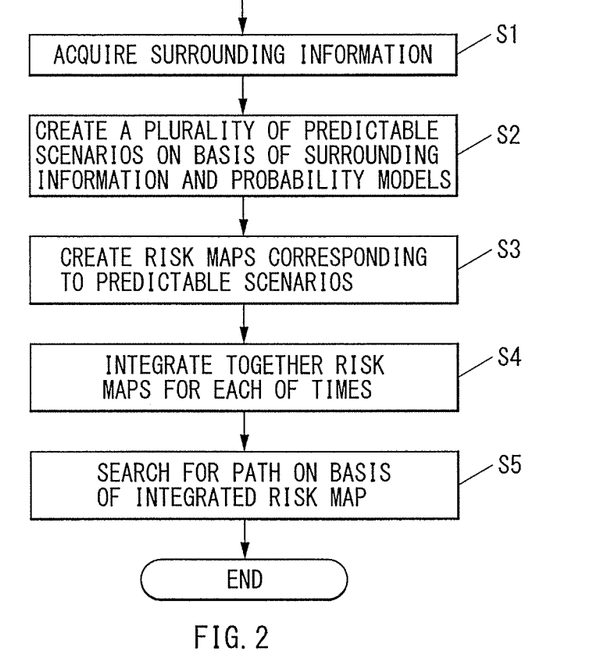
FIG. 2 is an example of a flowchart illustrating a flow of a flight path setting process.

FIG. 2 is a flowchart illustrating a flow of the flight path setting process.

The flight path setting process may be performed to search a safer flight path on the basis of prediction of a future situation, and thereby set the flight path. The flight path setting process may be executed when appropriate during a flight in the present implementation. The controller 14 may read and load the flight path setting program 130 stored in the memory 13, and thereby execute the flight path setting process, upon reception of instructions to execute the flight path setting process through reception of a control order, etc. from a facility on the ground.

It is to be noted that the UAV 1 is assumed to be flying along a flight path set initially toward a predetermined destination, in the present implementation.

Referring to FIG. 2, upon execution of the flight path setting process, the controller 14 first acquires the surrounding information of the own aircraft (the UAV 1) (step S1).

Specifically, the controller 14 may acquire, with the aircraft sensor 11, information such as position information of the own aircraft and position information of another aircraft, and also acquire information such as the weather information via the communicator 12. The controller 14 may store the acquired information in the memory 13.

It is to be noted that the information to be acquired may be basically current information (information at the time of acquiring the information). However, when the information to be acquired includes information on future prediction, the information on the future prediction may be also acquired. The information on the future prediction may be, for example, traveling information of another aircraft, weather information, etc. supplied from a control station.

Figure 4A:
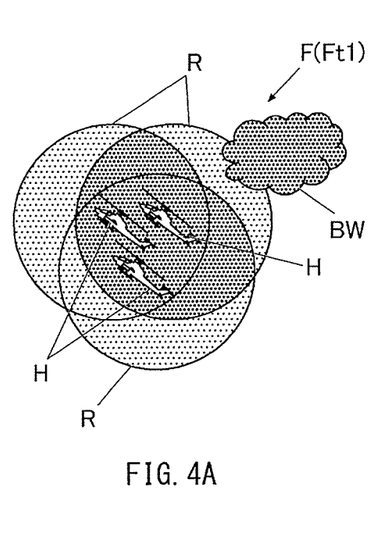
FIGS. 4A to 4C each illustrate an example of a predictable scenario at a time in future.
Figure 4B:
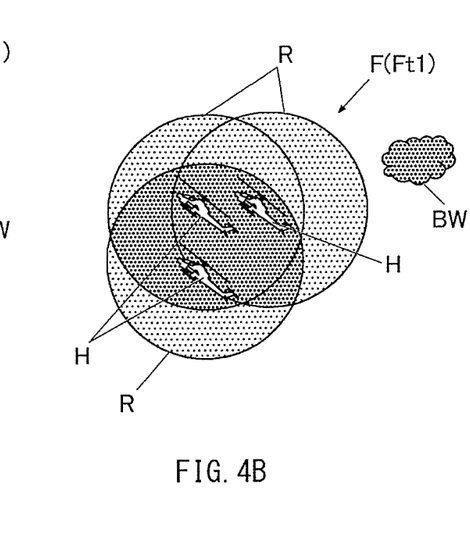
Figure 4C:
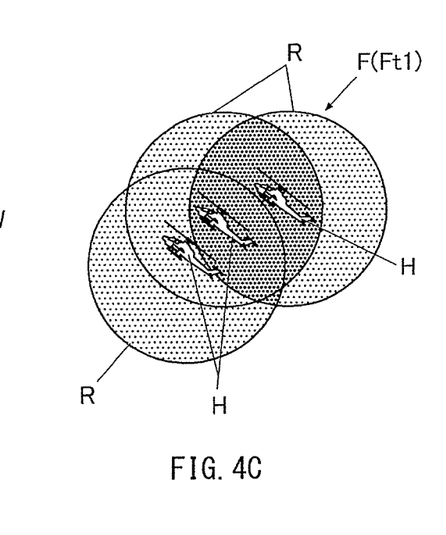

Thereafter, referring to FIGS. 4A to 4C, the controller 14 creates a plurality of predictable scenarios F for each of times (step S2). The predictable scenarios F are each a predicted surrounding situation of the own aircraft in the future.

Specifically, the controller 14 may read, from the memory 13, the surrounding information on the surrounding situation acquired in step S1, the probability models 132 corresponding to the surrounding situation, etc. Further, the controller 14 may run a simulation using the read surrounding information, the read probability models 132, etc., and thereby create the plurality of predictable scenarios F for each of a plurality of times in the future until creating the predictable scenarios F for a predetermined time in the future. The simulation may be run by Monte Carlo method, for example. The plurality of times in the future may be a time 10 minutes later the current time, a time 20 minutes later the current time, and so on.

Figure 6A:
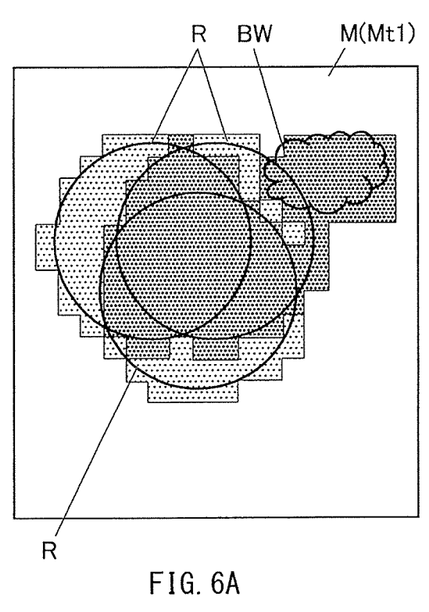
FIGS. 6A to 6C illustrate risk maps corresponding to the examples of the predictable scenarios illustrated in FIGS. 4A to 4C, respectively.
Figure 6B:
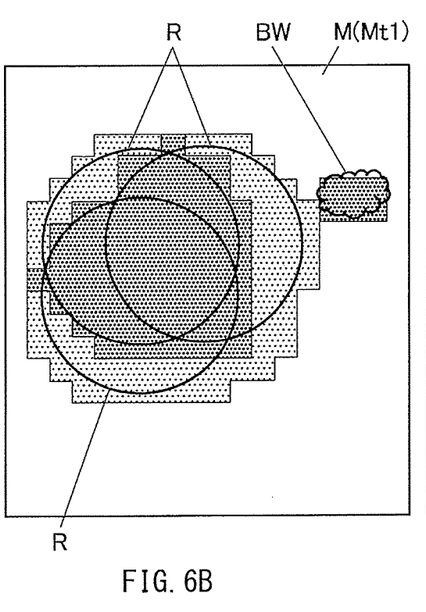
Figure 6C:
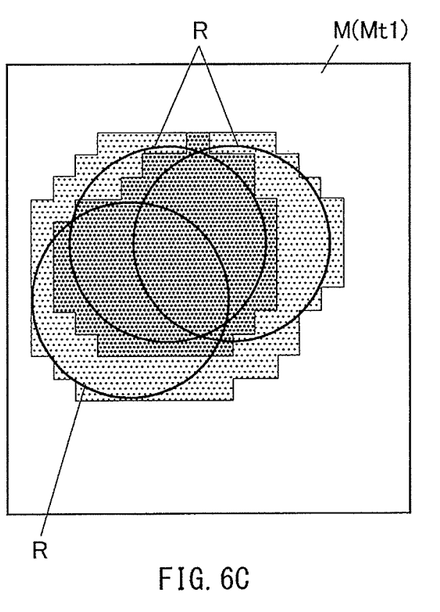

Thereafter, referring to FIGS. 6A to 6C, the controller 14 may create a plurality of risk maps M corresponding to the respective predictable scenarios F created in step S2 (step S3). The risk map M may present, on the map data 131, a risk to flight safety (safety during the flight) of the UAV 1.

Specifically, the controller 14 may read the map data 131 from the memory 13, and divide the read map data 131 into a plurality of cells in a matrix on a horizontal surface. For example, the controller 14 may divide the read map data 131 into a plurality of cells corresponding to respective squares that are arranged in a matrix and each have sides extending in a north-south direction and sides extending in a west-east direction. Further, the controller 14 may convert the risk in each of the cells into a numerical value on the basis of the predictable scenario F.

Upon converting the risk into the numerical value, the controller 14 may also create a current risk map M on the basis of the surrounding information acquired in step S1.

Figure 7:
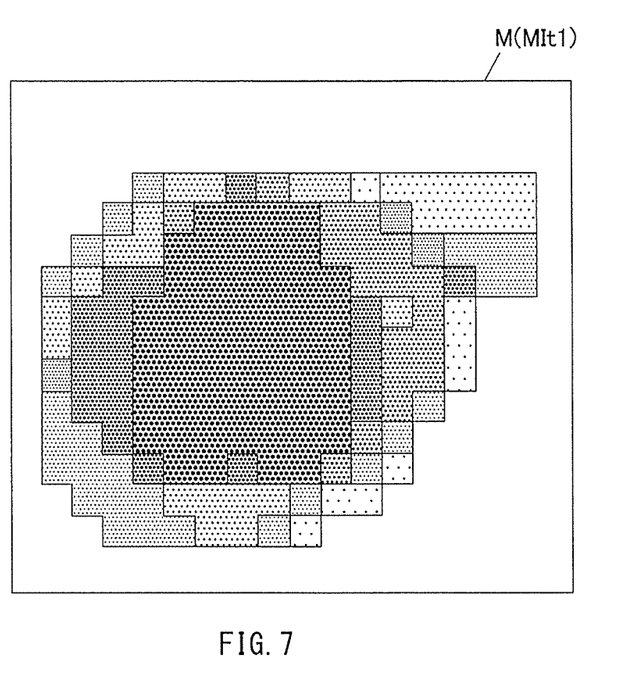
FIG. 7 illustrates an integrated risk map that integrates together the risk maps illustrated in FIGS. 6A to 6C.

Thereafter, referring to FIG. 7, the controller 14 may integrate together all of the risk maps M for each of the times, and thereby create an integrated risk map MI (step S4).

Specifically, the controller 14 may calculate an integration value of the numerical values of the risks in corresponding cells in all of the risk maps M for each of the times, and put the calculated integration values together in a single map. One integrated risk map MI may be thus created for each of the times. The integration value of the numerical values of the risks in the present implementation may refer to a value that integrates together the numerical values of the risks in corresponding cells in all of the risk maps M for corresponding one of the times, for example, by weighting the respective numerical values of the risks using coefficients that are set on the basis of a factor such as characteristics of the predictable scenarios F. However, the integration value of the numerical values of the risks may be a value such as a simple average value in some cases.

Thereafter, the controller 14 may search a flight path from a current position of the own aircraft to a position of the predetermined destination, on the basis of the integrated risk maps MI created in step S4 (step S5).

Specifically, the controller 14 may search an optimal flight path having the risk that is lowest, using the integrated risk maps MI that each integrate together the risk maps M for corresponding one of the times. As a method of searching the optimal flight path, a method such as A-Star algorithm may be used which is one of typical searching algorithms.

Thereafter, the controller 14 may update the flight path of the UAV 1 with the searched optimal flight path.

[Operation Example of Flight Path Setting Apparatus]

Next, the foregoing operation of the flight path setting apparatus 10 is described referring to a specific but non-limiting example.

The description of the present operation example is given referring to a case in which the UAV 1 flies in a region in the air with presence of a hindrance H, bad weather BW that makes the flight difficult, etc.

Figure 3:
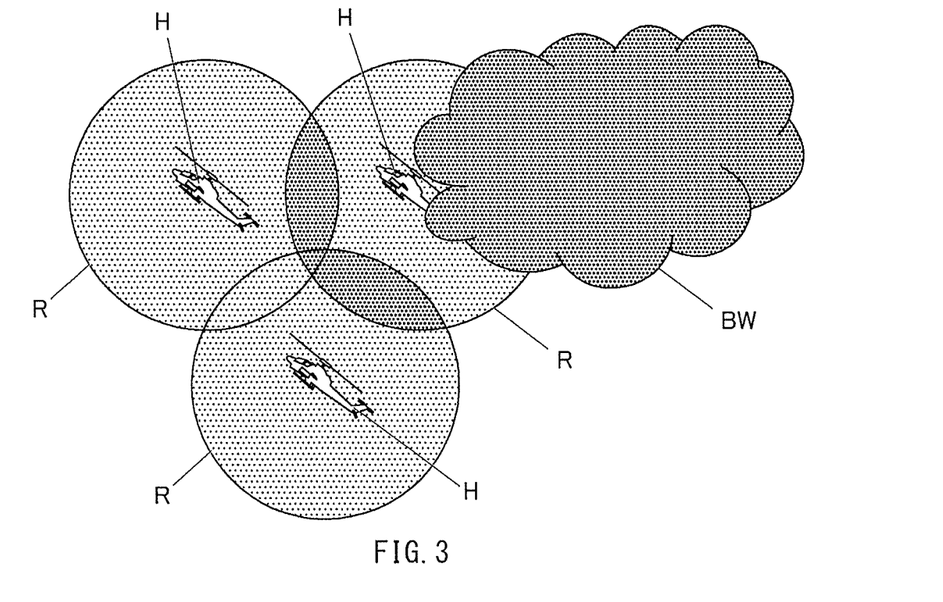
FIG. 3 illustrates an example of a current surrounding situation.
Figure 5:
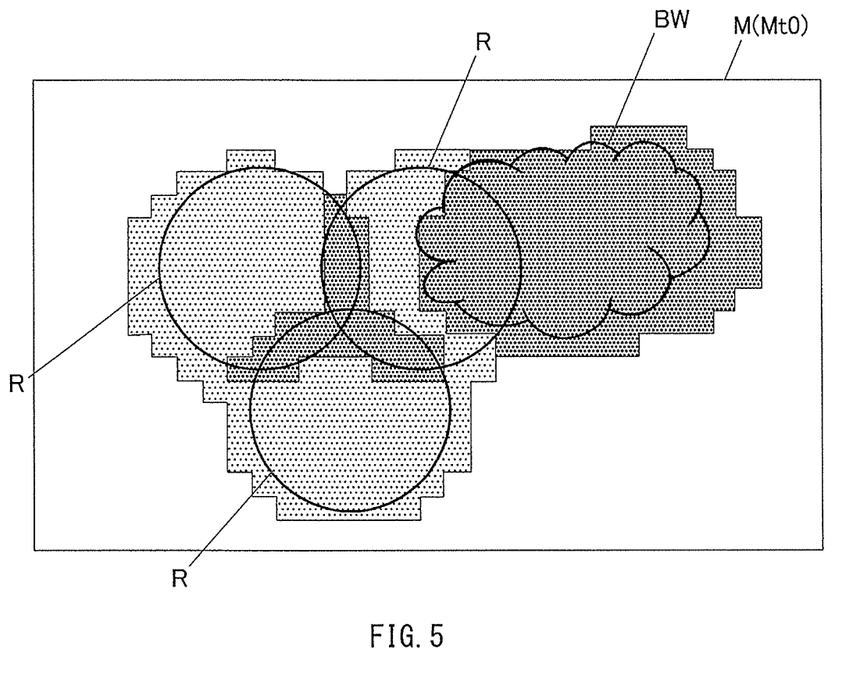
FIG. 5 illustrates a current risk map corresponding to the example of the current surrounding situation illustrated in FIG. 3.
Figure 8:
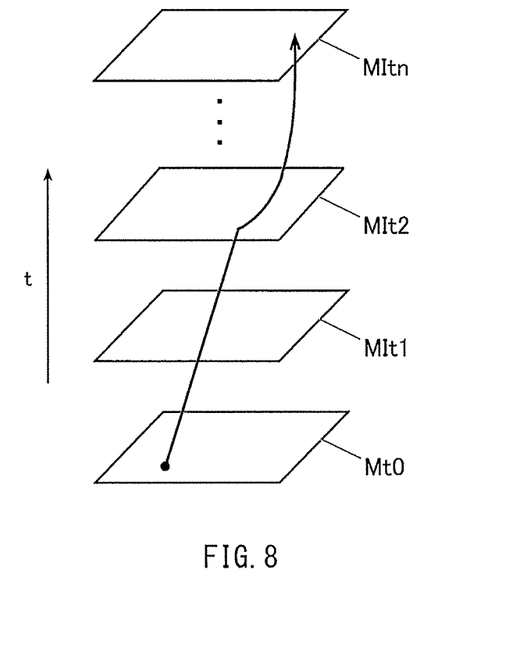
FIG. 8 describes path searching based on the integrated risk map.

FIGS. 3 to 8 are provided for describing the present operation example. FIG. 3 illustrates an example of a current surrounding situation. FIGS. 4A to 4C each illustrate an example of the predictable scenario F at a time in the future. FIG. 5 illustrates a current risk map M corresponding to the example of the surrounding situation illustrated in FIG. 3. FIGS. 6A to 6C illustrate risk maps M corresponding to the examples of the predictable scenarios F illustrated in FIGS. 4A to 4C, respectively. FIG. 7 illustrates an integrated risk map MI that integrates together the risk maps M illustrated in FIGS. 6A to 6C. FIG. 8 describes path searching based on the integrated risk maps MI.

Upon execution of the flight path setting process, the aircraft sensor 11 and the communicator 12 may acquire the surrounding information of the own aircraft (step S1).

Information on presence of three hindrances H and the bad weather BW may be acquired as the current surrounding information of the own aircraft (at the time of acquiring the information) as illustrated in FIG. 3. An influence range R of the hindrance H may be stored in advance in the memory 13 as information on the hindrance.

Thereafter, a simulation may be run using the surrounding information acquired in step S1, the probability models 132 read from the memory 13, etc., and the plurality of predictable scenarios F are thereby created for each of the predetermined times in the future (step S2).

Three predictable scenarios F(Ft1) may be thus created for a time t1 that is a time predetermined time period after the current time, for example, as illustrated in FIGS. 4A to 4C. The created three predictable scenarios F(Ft1) differ from each other in the positions of the three hindrances H, the state of the bad weather BW, etc. A plurality of predictable scenarios F(Ft2), F(Ft3), and so on may also be created in a similar manner for corresponding times t2, t3, and so on in the future, respectively, which are not illustrated.

Thereafter, the risks to flight safety in each of the predictable scenarios F may be converted into numerical values. The numerical values may be associated with the map data 131. The plurality of risk maps M may be thus created corresponding to the respective predictable scenarios F created in step S2 (step S3). The current risk map M may be also created corresponding to the current surrounding situation acquired in step S1.

As a result, the current risk map M(Mt0) (at a time t0) may be created as illustrated in FIG. 5, and three risk maps M(Mt1) may also be created corresponding to the three predictable scenarios F(Ft1) at the time t1 as illustrated in FIGS. 6A to 6C. Further, a plurality of risk maps M(Mt2), M(Mt3), and so on may be also created in a similar manner corresponding to the predictable scenarios F(Ft2), F(Ft3), and so on for the times t2, t3, and so on in the future, respectively, which are not illustrated.

It is to be noted that FIGS. 5 to 6C illustrate the risks to the flight safety by density of dots (including a region without any dot), where higher density of dots indicates a higher risk. FIGS. 5 to 6C illustrate the influence range R of the hindrance H and the bad weather BW with solid lines for the sake of easy understanding.

Thereafter, the integration value of the numerical values of the risks in corresponding cells in the risk maps M for each of the times may be calculated, and the integrated risk map MI that integrates together the risk maps M for corresponding one of the times may be thereby created (step S4).

As a result, an integrated risk map M(MIt1) that integrates together the three risk maps M(Mt1) at the time t1 may be created as illustrated in FIG. 7. Further, integrated risk maps M(MIt2), M(MIt3), and so on at the respective times t2, t3, and so on in the future may be created in a similar manner, which are not illustrated.

Thereafter, the flight path from the current position of the own aircraft to the position of the predetermined destination may be searched on the basis of the integrated risk maps MI created in step S4 (step S5). In more details, referring to FIG. 8, the flight path may be searched by a method such as A-Star algorism, using the current risk map M(Mt0) (at the time t0), and the respective integrated risk maps M(MIt1), M(MIt2), . . . , M(MItn) at the corresponding times t1, t2, . . . , tn in the future. The flight path having the risk to the flight safety that is lowest may be thus searched.

The flight path of the UAV 1 may be set to a flight path resulting from the searching.

[Effects]

As described above, according to the present implementation, the surrounding information on the surrounding situation of the UAV 1 is acquired, and the plurality of predictable scenarios F are created for each of the predetermined times in the future on the basis of the acquired surrounding information and the probability models 132 related to the surrounding situation. The predictable scenarios F are each the surrounding situation of the UAV 1 that is predicted for corresponding one of the predetermined times in the future. Further, the flight path is searched on the basis of the created predictable scenarios F.

Hence, providing the probability models 132 corresponding to factors in the surrounding situation that may threaten the flight safety makes it possible to set the flight path taking into consideration various changes in the surrounding situation that may occur in the future.

As a result, it is possible to create and set a safer flight path taking into consideration various factors that may threaten the flight safety, which is different from the technique that has taken into consideration only the atmosphere conditions.

Moreover, for example, it may be difficult to acquire information on movement of the hindrance such as fireworks and a flying body that is not under air traffic control such as a bird and a hang glider. However, providing the probability models 132 for the movement of such a hindrance makes it possible to set the flight path appropriately taking into consideration such information that may be difficult to acquire.

Moreover, the plurality of predictable scenarios F expressed as the risk maps M may be integrated together for each of the times, and a single flight path may be searched on the basis of the predictable scenarios F integrated together for each of the times (the integrated risk maps MI).

As a result, it is possible to save time, compared to a technique in which path searching is performed for the respective predictable scenarios to create a plurality of flight paths, and an optimal flight path is selected from the created flight paths. One reason is that the present implementation involves the calculation for path searching (optimization calculation) only once which takes relatively long calculation time period.

Moreover, the aircraft for which the path is set by the flight path setting apparatus 10 may be the UAV 1, and the flight path setting apparatus 10 may be mounted on the UAV 1. This makes it possible to achieve a safe autonomic flight of the UAV 1.

MODIFICATIONS

It is to be noted that the technology is not limitedly applicable to the foregoing implementations. It should be appreciated that modifications and alterations may be made by persons skilled in the art without departing from the scope as defined by the appended claims.

For example, although the operation example of the flight path setting apparatus 10 according to the foregoing implementation has been described referring to the example case in which three predictable scenarios F are created, the number of the predictable scenarios F to be created is not limited. However, the integrated risk map MI may be created with higher reliability as the number of the created predictable scenarios F is greater.

Moreover, the operation example of the flight path setting apparatus 10 has been described referring to the example case in which the factors that may threaten the flight safety are the hindrance H and the bad weather BW. However, it is possible to take into consideration any other factor as long as a risk attributed to the factor is appropriately convertible into a numerical value. Examples of such factor may include a hindrance in the air such as volcanic ashes, a region into which a rocket or a balloon may fly from the ground, terrain, and a building.

Moreover, the description has been given referring to the example in which the flight path setting apparatus 10 is applied to setting of the travel path of the UAV 1. However, any implementation of the present technology is also applicable to setting of a travel path of a manned aerial vehicle, and to setting of travel paths of various movable bodies such as a vehicle and a vessel besides the aircraft.

Moreover, the description has been given referring to the example in which the flight path setting apparatus 10 is mounted on the UAV 1. However, the flight path setting apparatus according to one implementation of the present technology may be provided in a facility on the ground. Further, the flight path setting apparatus mounted on an aircraft and the flight path setting apparatus provided in a facility on the ground may perform a control in association with each other.

The invention claimed is:

1. A travel path setting apparatus for setting a flight path from a current position of a movable body to a destination, the travel path setting apparatus comprising:
    a controller; and
    a non-transitory memory storing 1) probability models and 2) instructions that, when executed by the controller, cause the controller to:
        acquire, from one or more sensors, current surrounding information of the movable body at the current position at a current time;
        create, based on the current surrounding information and the probability models, 1) a first predictable scenario and a second predictable scenario for a first time, the first predictable scenario being different from the second predictable scenario, and 2) a third predictable scenario and a fourth predictable scenario for a second time, the third predictable scenario being different from the fourth predictable scenario, the first time being a first predetermined period of time after the current time, the second time being a second predetermined period of time after the first time;
        generate 1) a first risk map based on the first predictable scenario for the first time, wherein the first risk map is divided into a first cell and a second cell, the first cell being associated with a first degree of a risk and the second cell being associated with a second degree of the risk based on the first predictable scenario, 2) a second risk map based on the second predictable scenario for the first time, wherein the second risk map is divided into a third cell and a fourth cell that correspond to the first cell and the second cell of the first risk map, the third cell being associated with a third degree of the risk and the fourth cell being associated with a fourth degree of the risk based on the second predictable scenario, 3) a third risk map based on the third predictable scenario for the second time, wherein the third risk map is divided into a fifth cell and a sixth cell, the fifth cell being associated with a fifth degree of the risk and the sixth cell being associated with a sixth degree of the risk based on the third predictable scenario, and 4) a fourth risk map based on the fourth predictable scenario for the second time, wherein the fourth risk map is divided into a seventh cell and a eighth cell that correspond to the fifth cell and the sixth cell of the third risk map, the seventh cell being associated with a seventh degree of the risk and the eighth cell being associated with an eighth degree of the risk based on the fourth predictable scenario;
        generate 1) a first integrated risk map for the first time based on combining the first degree of the risk of the first cell of the first risk map with the third degree of the risk of the third cell of the second risk map and combining the second degree of the risk of the second cell of the first risk map with the fourth degree of the risk of the fourth cell of the second risk map, and 2) a second integrated risk map for the second time based on combining the fifth degree of the risk of the fifth cell of the third risk map with the seventh degree of the risk of the seventh cell of the fourth risk map and combining the sixth degree of the risk of the sixth cell of the third risk map with the eighth degree of the risk of the eighth cell of the fourth risk map; and
        determine a travel path for the movable body based on 1) determining a first location where the movable body moves to at the first time according to the first integrated risk map and 2) determining a second location where the movable body moves to at the second time according to the second integrated risk map.

2. The travel path setting apparatus according to claim 1, wherein the controller:
    converts a first risk associated with a first region in the first predictable scenario into a first numerical value, the first region corresponding to the first cell in the first risk map, the first numerical value indicating the first degree of the risk associated with the first cell in the first risk map;
    converts a second risk associated with a second region in the first predictable scenario into a second numerical value, the second region corresponding to the second cell in the first risk map, the second numerical value indicating the second degree of the risk associated with the second cell in the first risk map;
    converts a third risk associated with a third region in the second predictable scenario into a third numerical value, the third region corresponding to third cell in the second risk map, the third numerical value indicating the third degree of the risk associated with the third cell in the second risk map, both the third cell in the second risk map and the first cell in the first risk map corresponding to a first cell in the integrated risk map;
    converts a fourth risk associated with a fourth region in the second predictable scenario into a fourth numerical value, the fourth region corresponding to the fourth cell in the second risk map, the fourth numerical value indicating the fourth degree of the risk associated with the fourth cell in the second risk map, both the fourth cell in the second risk map and the second cell in the first risk map corresponding to a second cell in the integrated risk map;
    calculates a first integration value for the first cell in the integrated risk map based on the first numerical value and the third numerical value;
    calculates a second integration value for the second cell in the integrated risk map based on the second numerical value and the fourth numerical value; and
    searches for and sets the travel path having the risk that is lowest based on the integrated risk map comprising the first integration value and the second integration value.

3. The travel path setting apparatus according to claim 2, wherein the movable body is an unmanned aerial vehicle on which the travel path setting apparatus is mounted.

4. The travel path setting apparatus according to claim 1, wherein the movable body is an unmanned aerial vehicle on which the travel path setting apparatus is mounted.

5. A method of setting a travel path of a movable body, the method comprising:
    acquiring current surrounding information of the movable body at a current time;
    creating, based on the current surrounding information and probability models related to a surrounding situation of the movable body, 1) a first predictable scenario and a second predictable scenario for a first time, the first predictable scenario being different from the second predictable scenario, and 2) a third predictable scenario and a fourth predictable scenario for a second time, the first time being a first predetermined period of time after the current time, the second time being a second predetermined period of time after the first time;

generating 1) a first risk map based on the first predictable scenario for the first time, wherein the first risk map is divided into a first cell and a second cell, the first cell being associated with a first degree of a risk and the second cell being associated with a second degree of the risk based on the first predictable scenario, 2) a second risk map based on the second predictable scenario for the first time, wherein the second risk map is divided into a third cell and a fourth cell that correspond to the first cell and the second cell of the first risk map, the third cell being associated with a third degree of the risk and the fourth cell being associated with a fourth degree of the risk based on the second predictable scenario, 3) a third risk map based on the third predictable scenario for the second time, wherein the third risk map is divided into a fifth cell and a sixth cell, the fifth cell being associated with a fifth degree of the risk and the sixth cell being associated with a sixth degree of the risk based on the third predictable scenario, and 4) a fourth risk map based on the fourth predictable scenario for the second time, wherein the fourth risk map is divided into a seventh cell and a eighth cell that correspond to the fifth cell and the sixth cell of the third risk map, the seventh cell being associated with a seventh degree of the risk and the eighth cell being associated with an eighth degree of the risk based on the fourth predictable scenario;

generating 1) a first integrated risk map for the first time based on combining the first degree of the risk of the first cell of the first risk map with the third degree of the risk of the third cell of the second risk map and combining the second degree of the risk of the second cell of the first risk map with the fourth degree of the risk of the fourth cell of the second risk map, and 2) a second integrated risk map for the second time based on combining the fifth degree of the risk of the fifth cell of the third risk map with the seventh degree of the risk of the seventh cell of the fourth risk map and combining the sixth degree of the risk of the sixth cell of the third risk map with the eighth degree of the risk of the eighth cell of the fourth risk map; and determining a travel path for the movable body based on 1) determining a first location where the movable body moves to at the first time according to the first integrated risk map and 2) determining a second location where the movable body moves to at the second time according to the second integrated risk map.

6. A non-transitory tangible recording medium having a program, the program causing, when executed by a computer, the computer to implement a method comprising:

acquiring, from one or more sensors, current surrounding information of a movable body at a current time;

creating, on a basis of the current surrounding information and models, 1) a first predictable scenario and a second predictable scenario for a first time, the first predictable scenario being different from the second predictable scenario, and 2) a third predictable scenario and a fourth predictable scenario for a second time, the third predictable scenario being different from the fourth predictable scenario, the first time being a first predetermined period of time after the current time, the second time being a second predetermined period of time after the first time;

generating 1) a first risk map based on the first predictable scenario for the first time, wherein the first risk map is divided into a first cell and a second cell, the first cell being associated with a first degree of a risk and the second cell being associated with a second degree of the risk based on the first predictable scenario, 2) a second risk map based on the second predictable scenario for the first time, wherein the second risk map is divided into a third cell and a fourth cell that correspond to the first cell and the second cell of the first risk map, the third cell being associated with a third degree of the risk and the fourth cell being associated with a fourth degree of the risk based on the second predictable scenario, 3) a third risk map based on the third predictable scenario for the second time, wherein the third risk map is divided into a fifth cell and a sixth cell, the fifth cell being associated with a fifth degree of the risk and the sixth cell being associated with a sixth degree of the risk based on the third predictable scenario, and 4) a fourth risk map based on the fourth predictable scenario for the second time, wherein the fourth risk map is divided into a seventh cell and a eighth cell that correspond to the fifth cell and the sixth cell of the third risk map, the seventh cell being associated with a seventh degree of the risk and the eighth cell being associated with an eighth degree of the risk based on the fourth predictable scenario;

generating 1) a first integrated risk map for the first time based on combining the first degree of the risk of the first cell of the first risk map with the third degree of the risk of the third cell of the second risk map and combining the second degree of the risk of the second cell of the first risk map with the fourth degree of the risk of the fourth cell of the second risk map, and 2) a second integrated risk map for the second time based on combining the fifth degree of the risk of the fifth cell of the third risk map with the seventh degree of the risk of the seventh cell of the fourth risk map and combining the sixth degree of the risk of the sixth cell of the third risk map with the eighth degree of the risk of the eighth cell of the fourth risk map; and setting a travel path for the movable body based on 1) determining a first location where the movable body moves to at the first time according to the first integrated risk map and 2) determining a second location where the movable body moves to at the second time according to the second integrated risk map.

* * * * *